(12) United States Patent
Beaudoin

(10) Patent No.: US 7,124,369 B2
(45) Date of Patent: Oct. 17, 2006

(54) MULTI-LAYER PATH EXPLORER

(75) Inventor: Luc Beaudoin, Gatineau (CA)

(73) Assignee: Nortel Networks Limited, St. Laurent (CA)

( * ) Notice: Subject to any disclaimer, the term of this patent is extended or adjusted under 35 U.S.C. 154(b) by 761 days.

(21) Appl. No.: 10/107,472

(22) Filed: Mar. 28, 2002

(65) Prior Publication Data

US 2003/0184599 A1  Oct. 2, 2003

(51) Int. Cl.
*G06F 3/00* (2006.01)

(52) U.S. Cl. .................. 715/738; 715/734; 715/854

(58) Field of Classification Search ........ 715/734–738, 715/853–855, 712–713, 772, 810, 835–840, 715/969, 976; 709/223–224
See application file for complete search history.

(56) References Cited

U.S. PATENT DOCUMENTS

| | | | | |
|---|---|---|---|---|
| 5,295,243 A * | 3/1994 | Robertson et al. | ........... | 715/848 |
| 5,295,244 A * | 3/1994 | Dev et al. | ........... | 715/853 |
| 5,764,913 A * | 6/1998 | Jancke et al. | ........... | 709/224 |
| 5,805,166 A * | 9/1998 | Hall et al. | ........... | 715/839 |
| 5,910,803 A * | 6/1999 | Grau et al. | ........... | 715/734 |
| 6,020,889 A * | 2/2000 | Tarbox et al. | ........... | 715/736 |
| 6,035,330 A * | 3/2000 | Astiz et al. | ........... | 709/224 |
| 6,046,742 A * | 4/2000 | Chari | ........... | 715/734 |
| 6,054,987 A * | 4/2000 | Richardson | ........... | 715/734 |
| 6,078,324 A * | 6/2000 | Phathayakorn et al. | ........... | 715/835 |
| 6,112,015 A * | 8/2000 | Planas et al. | ........... | 709/223 |
| 6,175,363 B1 * | 1/2001 | Williams et al. | ........... | 715/746 |
| 6,219,050 B1 * | 4/2001 | Schaffer | ........... | 715/853 |
| 6,225,999 B1 * | 5/2001 | Jain et al. | ........... | 715/734 |
| 6,229,540 B1 * | 5/2001 | Tonelli et al. | ........... | 715/735 |
| 6,380,957 B1 * | 4/2002 | Banning | ........... | 715/828 |
| 6,430,612 B1 * | 8/2002 | Iizuka | ........... | 709/223 |
| 6,462,762 B1 * | 10/2002 | Ku et al. | ........... | 715/853 |
| 6,473,467 B1 * | 10/2002 | Wallace et al. | ........... | 375/267 |
| 6,608,635 B1 * | 8/2003 | Mumm | ........... | 715/736 |
| 6,633,312 B1 * | 10/2003 | Rochford et al. | ........... | 715/736 |
| 6,771,287 B1 * | 8/2004 | Walker et al. | ........... | 715/736 |

(Continued)

FOREIGN PATENT DOCUMENTS

EP            1185001            8/2001

(Continued)

OTHER PUBLICATIONS

I. Barhumi, G. Leus and M. Moonen, Optimal Training Sequences for Channel Estimation in Mimo OFDM Systems in Mobile Wireless Channels, Feb. 19, 2002, pp. 1-6.

*Primary Examiner*—Sy D. Luu
(74) *Attorney, Agent, or Firm*—Mark J. Sprigings; Ogilvy Renault LLP

(57) ABSTRACT

The invention provides an improved method of exploring paths having multiple layers. Such paths may be through any of a number of types of networks, such as transportation networks, distribution networks, business structure networks, or telecommunication networks. The method initially displays in a path explorer view, the nodes and links of a first layer of the path in a linear configuration. Upon selection/deselection of a layer expander icon located near the first layer node at which the path traverses to the second layer, the method expands/collapses the second layer of nodes and links in a linear configuration which is parallel to, but offset from the first layer. The method further contemplates the display of a topology view which, in conjunction with the path explorer view, graphically displays a structure of a selected layer of the path, with the path visually distinguished therein.

36 Claims, 8 Drawing Sheets

U.S. PATENT DOCUMENTS

| | | | |
|---|---|---|---|
| 6,816,175 B1 * | 11/2004 | Hamp et al. | 715/854 |
| 2002/0122381 A1 | 9/2002 | Wu et al. | 370/208 |
| 2002/0122383 A1 * | 9/2002 | Wu et al. | 370/210 |
| 2004/0041833 A1 * | 3/2004 | Dikhit | 345/738 |

FOREIGN PATENT DOCUMENTS

| | | |
|---|---|---|
| EP | 1185048 | 8/2001 |
| WO | 0176110 | 10/2001 |

* cited by examiner

MULTI-LAYER PATH EXPLORER

FIELD OF THE INVENTION

This invention relates to methods of exploring paths, and in particular to an improved method of exploring paths having multiple layers.

BACKGROUND OF THE INVENTION

In many industries, it is desirable to view a path taken by a particular object, idea or signal, as it travels through for example, transportation, distribution, business or communication networks. Common examples include tracking of a courier package from an originating point to its destination, examining the travel of individuals through a transportation network, viewing a path a proposal may take within a business from conception through to final approval, or examining an assigned path of data traffic through a telecommunication network.

Such paths typically consist of nodes and links, with nodes representing hubs, intersections, action points, sources, destinations, etc., and links representing the logical or actual transportation or communication links between the nodes. For example, in a communication network, the nodes may be communication devices such as routers or antenna base stations, while the links may be any means of communication between two nodes such as through copper wire, optical cable, or microwaves. In a transportation network, nodes may be airports, train stations, or shipping ports, while the links may be air routes, train routes or shipping routes.

Many methods have been developed to view paths. One example is a geographic topology which displays nodes according to their geographic locations, as well as the links which connect the nodes. In one version, all nodes and all links are displayed, with the specific nodes and links comprising the path of interest highlighted in the geographic topology. In another version, only those nodes and links which make up the path of interest is displayed. Another example of a method of viewing paths is a logical topology, which is similar to the geographic topology except that the nodes are spatially arranged not according to their geographic locations, but in accordance with some other logical organization. A third example is a line view, wherein a path is represented by a simple linear representation of all of the nodes which comprise the path, with link representations therebetween.

Each of the above methods are useful for viewing simple paths. However, where paths become complex, these methods may fail. One source of complexity is the sheer number of nodes and links which may comprise a path. Another source of complexity is the amount of information which must be displayed in respect of each of the nodes and links to be viewed.

A third source of complexity is where the nodes are grouped into layers, wherein it may be desirable to know which nodes fall within which layer, and further, information respecting each layer may need to be viewed. One example of a network in which the nodes are grouped into layers is a distribution network, wherein the nodes may consist of source/destinations, storage facilities, trucking depots, and airports. In such a case, the nodes may be grouped into four distinct node layers, the first being a pick-up/delivery layer, the second being a storage layer, the third being a trucking layer, and the fourth being an air transportation layer. Thus a path from pick-up to delivery may progress from nodes in the pick-up/delivery layer, to the trucking layer, to the air transportation layer, to the storage layer, to the trucking layer, and back to the pick-up/delivery layer. Similarly, in a telecommunication network, node layers may include an IP (Internet Protocol) layer, a SONET (Synchronous Optical Network) layer, an SDH (Synchronous Digital Hierarchy) layer, an ATM (Asynchronous Transfer Mode) layer, and an optical layer. In a business plan network, node layers may include a planning committee layer, a finance layer, an engineering layer, and a marketing layer. Of course, there may exist sub-layers within each layer. For example, in the telecommunication context, there may be multiple SONET layers, grouped by geographic location, for example.

Where nodes are grouped into layers, it may at times be desirable to view all nodes in the path, grouped according to the layer in which a particular node may belong. Other times, it may be desirable to omit nodes of a certain layer, allowing an individual to view only those layers of interest. Current solutions include identifying in a geographic or logical topology, or in a linear representation, nodes which belong in a particular layer using a distinctive colour, special icons, text, or by drawing a box around nodes comprising a node layer. However, such identifiers tend to clutter the path representation, and make it difficult to discern the node layers. Further, such solutions fail when a large number of nodes need to be viewed.

SUMMARY OF THE INVENTION

In a broad aspect, the present invention provides a method in a computer system for displaying a representation of a path, wherein the path includes a plurality of nodes in a sequential order, each of the nodes being part of a first node layer or a second node layer. This method includes the steps of displaying in a path explorer view, a path representation comprising a first line of node icons, with each of these first line node icons representing a node of the first node layer; displaying a selectable layer expander icon; and upon a first selection of the layer expander icon, displaying in the path representation, a second line of node icons each representing a node of the second node layer, the second line being parallel to, and offset from the first line. The node icons are positioned in sequential order along the path representation. Optionally, upon a second selection of the layer expander icon, the second line of node icons will be erased from the path explorer view.

In other aspects, the invention includes the option of displaying in conjunction with the path explorer view, a topology view which shows a structure of a node layer of the path. Further, the selection of a particular node layer, either by selecting designated icons in the path explorer view or the topology view may cause the structure of the selected node layer to be displayed in the topology view, with the nodes of which the path is comprised being visually distinguished.

The present invention also contemplates a GUI (graphical user interface) embodying the method of the present invention, a computer-readable medium having stored thereon instructions for directing a host computer to implement the method of the present invention, as well as a computer system adapted to execute a path explorer application directing a computer to implement the method of the present invention.

Advantageously, the present invention provides a method of viewing paths comprising multiple layers of nodes, which method allows a user to interactively view a large number of nodes, and the layers in which the nodes belong, clearly and easily.

BRIEF DESCRIPTION OF THE DRAWINGS

Preferred embodiments of the invention will now be described with reference to the attached drawings in which.

DETAILED DESCRIPTION OF THE PREFERRED EMBODIMENTS

A preferred embodiment of the method of the present invention will now be described in the context of a telecommunication network. In this example, the preferred embodiment method is used to interactively display information for a path through a telecommunication network having multiple layers such as IP, SONET and optical layers. The nodes are communication devices such as transmitters, routers, amplifiers, and receivers, while the links are the communication links between the nodes, most typically optical cable.

However, before describing the preferred embodiment method, a demonstration of which is illustrated in FIGS. 3 through 7, an exemplary context for the application of the preferred embodiment method of the present invention will first be described with reference to FIG. 1, and an exemplary path to be explored using the preferred embodiment method will be described with reference to FIG. 2.

Figure 1:
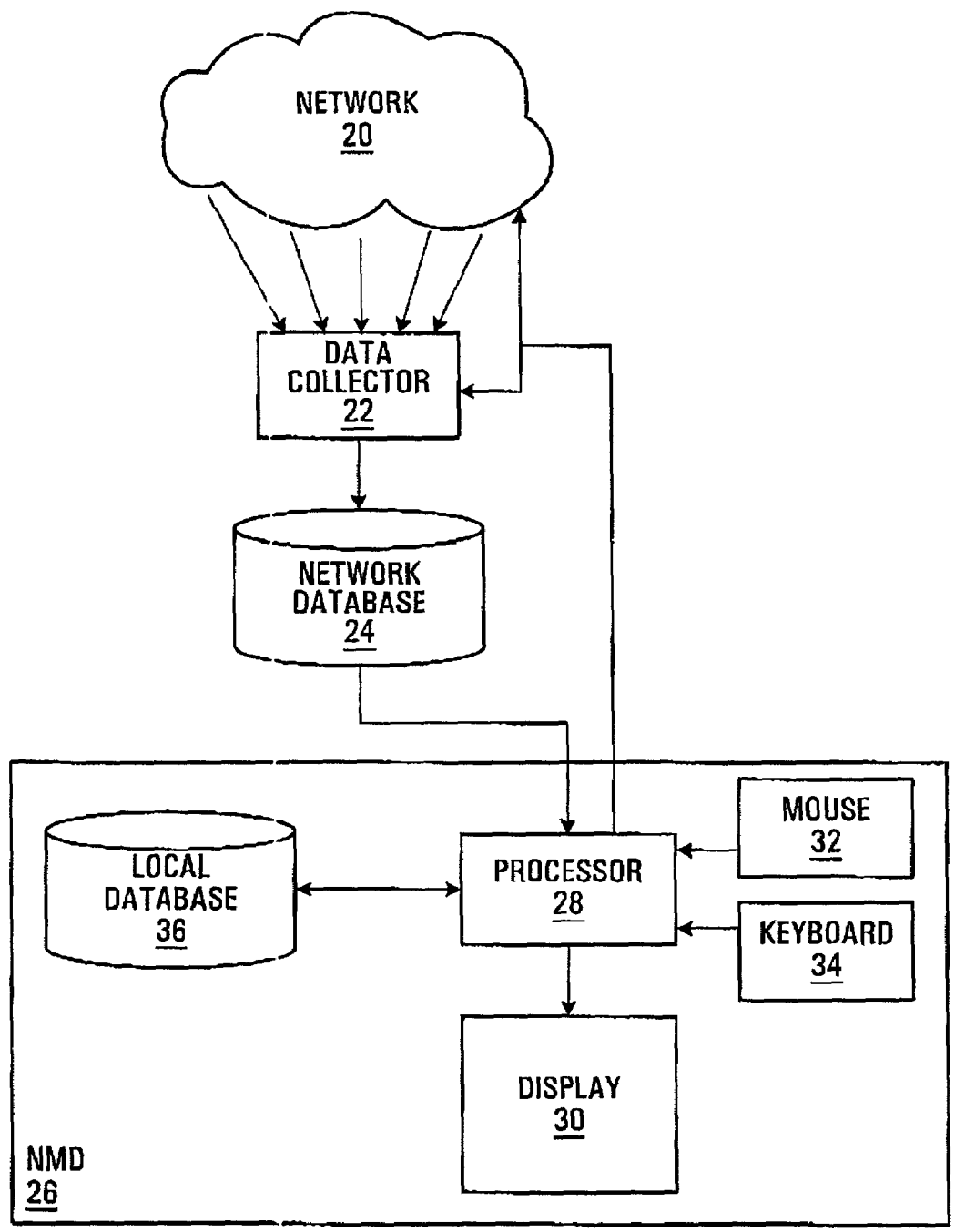
FIG. 1 is a block diagram of a computer system attached to a network, which may be used to implement a preferred embodiment method of the present invention.

FIG. 1 is a block diagram of a typical computer system used by a network administrator to administer a telecommunication network. In this illustration, the network 20 is connected to a data collector 22 which in turn is connected to a network database 24. The network database 24 is then connected to a network management device, or NMD 26.

The data collector 22 is capable of collecting network information from the network 20. Such network information may include for example, a level of traffic across nodes and links of the network, or status information representing the status of various nodes and links contained in the network 20. Status information may include any alarms which may be detected at such nodes or links. The manner in which the data collector 22 collects network information from the network 20 is well known in the telecommunication field.

Upon receipt of network information from the network 20, the data collector 22 stores this network information in the network database 24. The network database 24 may also have stored on it architectural, technical, or identification data for the network nodes and links, or various paths of data transmission in the network 20.

The NMD 26 has a network management processor 28 which is connected to a display 30, and also to user input devices such as a mouse 32 and a keyboard 34. If the display 30 is touch sensitive, then the display itself may also serve as a user input device. The processor 28 is also connected to a local database 36. The NMD 26 is adapted to perform four functions. First, it executes the method of the present invention to interactively display a path of interest on the display 30. Second, it processes data stored in the network database 24 as well as the local database 36, in accordance with instructions received from a network administrator through the user input devices 32, 34, to put it into a form suitable for display. Third, in some cases, the NMD 26 may request the data collector 22 to obtain certain specific information from the network 20. Finally, the NMD 26 may manipulate the performance of the network 20, for example by respecifying a different path of data transmission for a specific data stream.

Although one exemplary context for the application of the preferred embodiment method of the present invention has been described in detail above, it is to be understood that the method may be used in other contexts. Notably, the computer system executing the method may be any system wherein a processor is connectable to a network or a database containing network information, and which is capable of displaying graphical information and receiving user inputs.

An exemplary path which is the subject of the demonstration of the preferred embodiment method shown in FIGS. 3 through 7 will now be described with reference to FIG. 2, which shows a topology of this multi-layer path. Although the view shown in FIG. 2 is not part of the method of the present invention, it will be described with some detail since the same symbols are used in the preferred embodiment method depicted in FIGS. 3 through 7, and additionally, since such detail will assist in understanding the nature of the path which is the subject of the path exploration example shown in these later figures.

Figure 2:
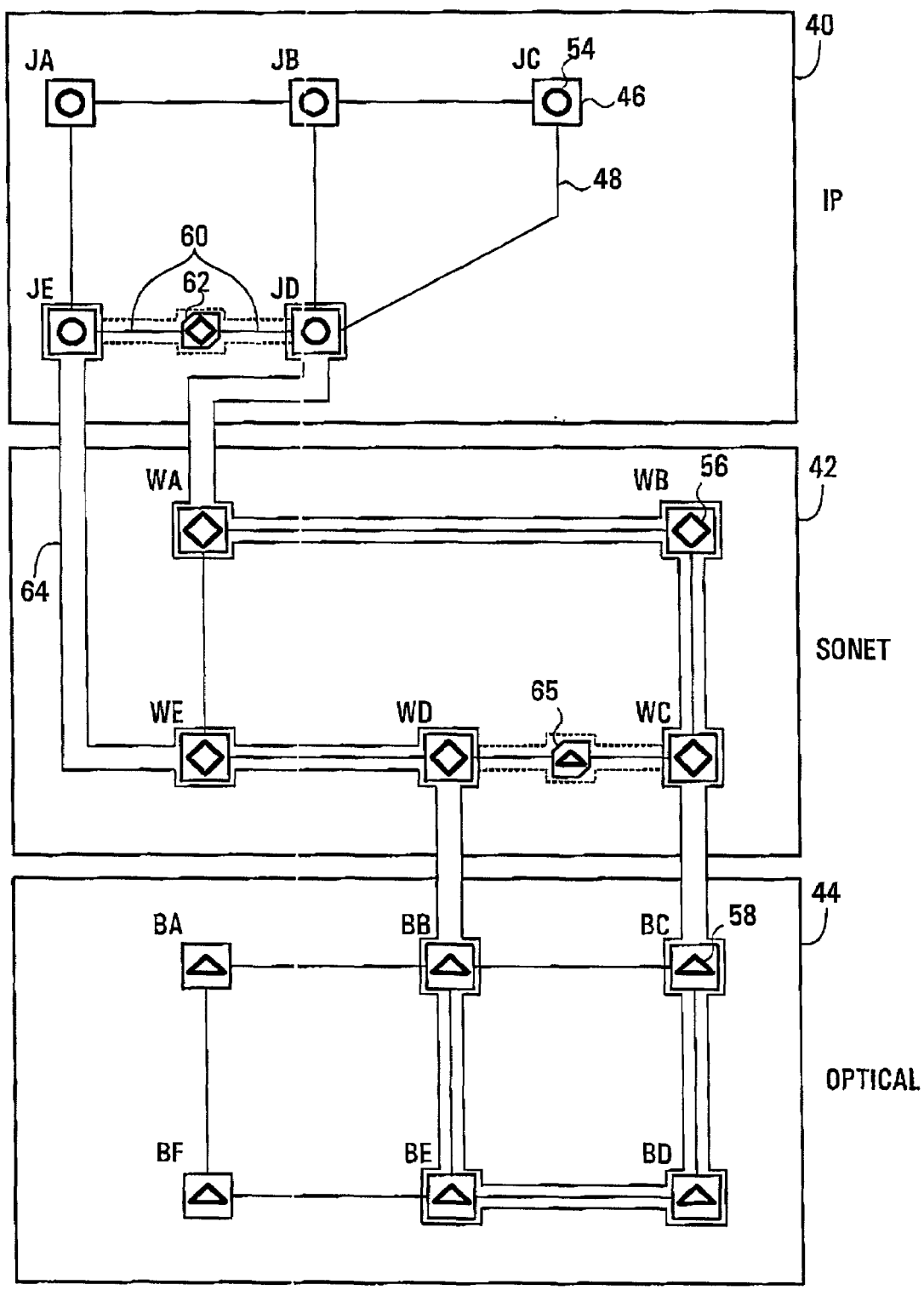
FIG. 2 is a topological view of an exemplary path through a telecommunication network, said path being used to illustrate the preferred method embodiment of the present invention.

FIG. 2 shows three topological views 40, 42 and 44 depicting three node layers, and the nodes and links of which each node layer is comprised. In this case, the three node layers are an IP layer 40, a SONET layer 42 and an optical layer 44. The IP layer 40 consists of five nodes, JA through JE, the SONET layer 42 consists of five nodes, WA through WE, and the optical layer 44 consists of six nodes, BA through BF. In this particular example, the three layers are distinguished by the technology used by the nodes which make up the layer. It is to be understood that in the telecommunication context, node layers may be distinguished by other features, geographic location for example.

In FIG. 2, the nodes are represented by node icons (46 for example), while the links are represented by link lines (48 for example) connecting the node icons. Within each of the node icons is a symbol representing the technology used by the represented node. In this example, a circle (54 for example) is used to depict IP technology, a diamond (56 for example) for SONET technology, and a triangle (58 for example) for optical technology.

Sometimes, a link between two nodes in a node layer of a particular technology may only be a logical link in the sense that there is no direct link of that technology between those two nodes. Such is the case between the two nodes JE and JD in the IP layer 40. Although a link line 60 is shown between node icons JE and JD, a layer icon 62 bisecting this link line 60 indicates that it is the nodes of another technology layer through which traffic between the nodes JE and JD flows. This other technology layer is identified by a symbol within this layer icon 62, in this case a diamond, indicating the SONET layer 42. Thus, instead of flowing over a direct link, data traffic flowing between nodes JE and JD in this example flows through nodes and links of the SONET layer 42.

The same may be said of the link between nodes WD and WC of the SONET layer 42. Again, a layer icon 65 appears between the node icons representing these two nodes, this time with a triangle symbol within. Thus, instead of flowing over a direct link, data traffic flowing between nodes WD and WC flows through nodes and links of the optical layer 44.

The actual path for data traffic represented by the logical link between nodes JE and JD in the IP layer is highlighted with outlining 64 in FIG. 2. As may be seen, this path has a sequential order of nodes over which it travels. First, the path travels from node JE in the IP layer 40 to node WE of the SONET layer 42. The path then travels to node WD of the SONET layer 42 where another logical link is encountered. At this point, the actual path traverses to node BB of the optical layer 44. After travelling over nodes BE, BD and BC of optical layer 44, the path returns to the SONET layer 42 where it travels over nodes WC, WB and WA. Finally, the path returns to node JD of the IP layer 40. It is this actual path of data transmission between nodes JE and JD which will be the subject of the demonstration of the preferred embodiment method of the present invention depicted in FIGS. 3 through 7, and discussed below.

In this particular example, the path illustrated in FIG. 2 is a static one which has been assigned directly or indirectly by the network administrator for a particular stream of data traffic through the telecommunication network. Thus, information relating to the path structure is stored in the network database 24 which information is retrieved and processed by the network management processor 28 for display in accordance with the preferred embodiment method. Further, dynamic information such as the status of nodes and links on this static path may be retrieved by the data collector 22 from the network 20 as required, for use by the network management processor 28. In other examples (not shown or discussed), the preferred embodiment method of the present invention may be used to display a dynamic path, such as in the pure IP context. In such a case, the network administrator would typically be viewing historic information for a path taken by a particular packet of data.

The preferred embodiment method of the present invention will now be described with reference to the demonstration illustrated in FIGS. 3 through 7. Although the preferred embodiment method may have many additional features relevant to the administration of the network 20, only those which are related to the present invention will be described below.

Figure 3:
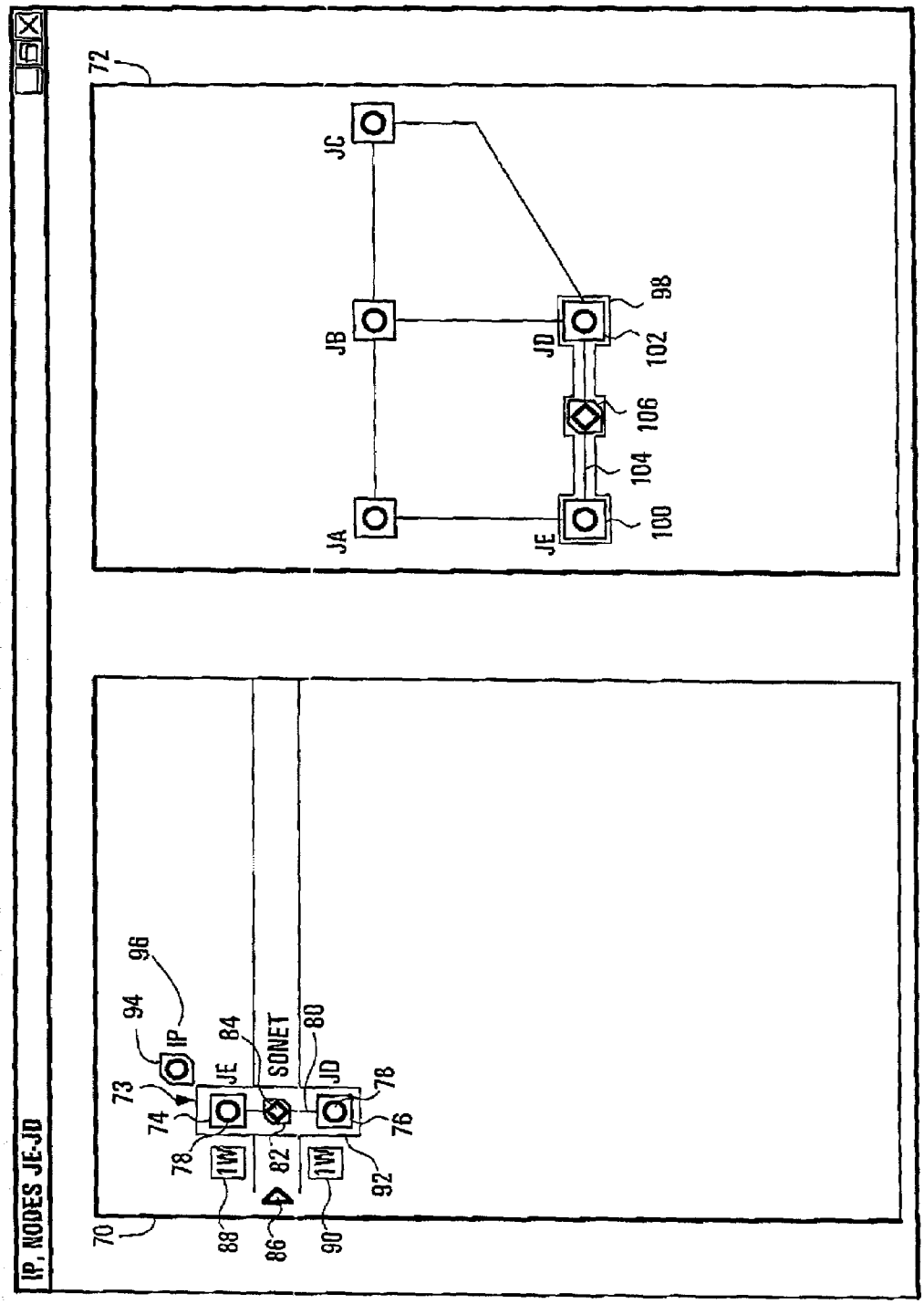
FIG. 3 is an illustration of a display generated in accordance with the preferred embodiment method of the present invention, displaying a first line of node icons in a path explorer panel, and a topology of a first node layer in a topology panel.

In FIG. 3, a path explorer panel 70 and a topology panel 72 are displayed. These panels may be displayed as part of a larger network management application, or may comprise an application of their own. The particular path to be displayed in the path explorer panel 70 and the topology panel 72 may be selected through any of a number of well-known means. For example, the path may simply be selected out of a list of all paths in the network. Alternatively the network administrator may select to view a path affected by an alarm at a given node or link. In this demonstration, the network administrator has selected the path illustrated in FIG. 2, and described above.

The path explorer panel 70 displays a path representation showing nodes of the selected path. These nodes are represented by node icons, 74 for example, which appear in the path explorer panel 70 in a sequential order from top to bottom, which sequential order corresponds to the order of the nodes in the selected path, as described above. The path representation is divided into multiple path segments along its length, in each of which appears a node icon.

As shown in FIG. 3, the path explorer panel initially displays only node icons representing nodes of a first node layer, in this case, those of the IP layer in the selected path. These node icons 74 and 76, representing nodes JE and JD of the IP layer respectively, appear in a first line 73 of node icons, in adjacent path segments. As with the node icons displayed in the topology of FIG. 2, each or the node icons 74, 76 have within them a symbol which identifies the technology associated with the represented node. In this case, the technology is IP, and as such circles 78 are shown inside the node icons 74, 76. To the left of the node icons 74, 76 are alarm indicators 88, 90 each of which indicate an alarm state of the node represented by the associated node icon. In this case, each of the two nodes represented by the node icons 74, 76 have one warning alarm associated therewith. Of course, any coding may be used by the alarm indicators 88, 90 to indicate an alarm state. Further, in addition to, or instead of alarm indicators 88, 90 indicating the alarm state of the nodes, the path explorer panel may communicate other information concerning the nodes or the links between them, traffic capacity, location, or protection for example.

Connecting the two node icons 74, 76 is a link line 80. As discussed above, this particular link connecting nodes JE and JD is a logical link which traverses nodes of another technology layer. This fact is communicated by the presence of a layer icon 82 near the node icon representing the IP layer "traversing node", or the last IP layer node in the sequential order before the path traverses to nodes of the other technology layer. In this case, the IP laser traversing node is node JE, and the layer icon 82 bisects the link line 80 immediately following the node icon 74 representing this node. To communicate the technology layer over whose nodes data traffic on the link between nodes JE and JD travels, a diamond symbol 84 is displayed within the layer icon 82, indicating the SONET technology layer. The technology layer represented by this layer icon 82 is also indicated by the technology label "SONET" appearing beside the layer icon 82.

To the left of, and associated with the layer icon 82 is shown a selectable layer expander icon 86, which in this case is a small triangle. That the triangle of this layer expander icon 86 points to the right indicates that selecting this layer expander icon 86 will cause to be expanded a second line of node icons representing nodes of the node layer represented by the associated layer icon 82 (discussed further below with reference to FIG. 4).

The first line 73 of node icons is highlighted using a box outline 92, labeled at its top right corner by a layer icon 94 whose symbol within (a circle), and label alongside 96 indicates that this node layer is an IP layer.

Thus, the path explorer panel 70 shown in FIG. 3 informs the network administrator that the selected path consists of two IP nodes, JE and JD of the IP layer, and that the link between the two nodes is a logical link which travels over nodes of a SONET layer. Each of the two nodes JE and JD also have one warning alarm.

To the right of the path explorer panel 70 is the topology panel 72. The topology panel 72 in FIG. 3 is essentially the same as that appearing in the top panel of the topology displayed in FIG. 2 and as such will not be described in detail here. It is to be noted that as it is the first line 73 of nodes representing the IP layer which is highlighted 92 in the path explorer panel 70, it is the topology of this IP layer which is displayed in the topology panel 72. Further, those node icons 100 and 102 and link lines 104 of this topology representing nodes and links which are part of the selected path are highlighted in the topology panel 72, again by outlining 98. In this case, the network elements which are part of the selected path are the two nodes JE and JD represented by node icons 100 and 102, and the link connecting the two, represented by the link line 104 connecting the two node icons 100 and 102. Again, the presence of a layer icon 106 with a diamond within, near the node icon 100 representing the IP traversing node JE, in this case bisecting the link line 104, indicates that the link between nodes JE and JD is a logical link which travels over the nodes of a SONET layer.

Figure 4:
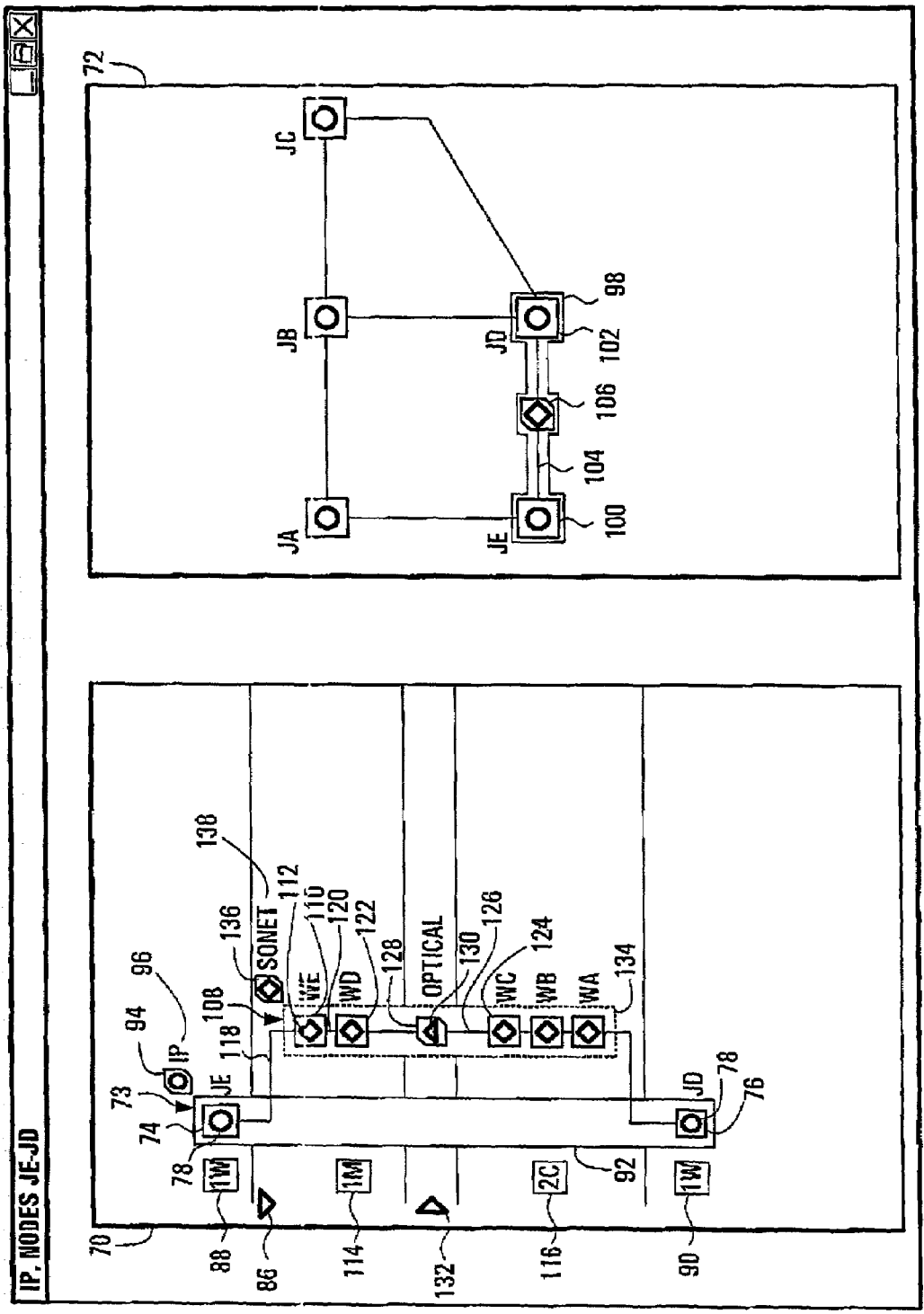
FIG. 4 is an illustration of the display of FIG. 3 wherein a network administrator has selected a layer expander icon in the path explorer panel.

In FIG. 4, the network administrator has selected the layer expander icon 86 representing the SONET layer in the path explorer panel 70 in FIG. 3. As a result, a second line 108 of node icons representing nodes of the SONET layer has been expanded in the path explorer panel 70. Further, the layer expander icon 86 representing the SONET layer is now pointing down, indicating that the SONET layer has been expanded.

In the illustrated example, the mechanism for this expansion is as follows. First, the number of path segments of which the path representation is comprised is increased by the number of SONET node icons to be displayed. Second, the IP node icons representing nodes which follow the IP traversing node JE are shifted down the path representation by this same number of path segments. Third, the second line 108 of node icons representing nodes of the SONET layer is displayed in the vacated path segments of the path representation.

If the SONET layer expander icon 86 is now selected again, the second line 108 of node icons would be collapsed returning the path explorer panel 70 to the state shown in FIG. 3. In particular, the second line 108 of node icons would be erased, the IP node icons representing nodes which follow the IP traversing node JE would be shifted up the path representation by the number of SONET node icons erased, and the number of path segments of which the path representation is comprised would be decreased by the same number.

The second line 108 of node icons is parallel to, and offset from the first line 73 of node icons to identify it as representing a different technology layer. Corresponding with the path illustrated in FIG. 2, the nodes of the SONET layer through which the path of interest passes are nodes WE, WD, WC, WB and WA. These nodes are represented once again by node icons (110 for example), this time with diamond symbols (112 for example) within, identifying the technology for these nodes as SONET. Alarm indicators 114, 116 are displayed to the left of some of the node icons 110 etc. of the second line 108. In this case, the alarm indicators 114 and 116 of the second line 108 indicate that nodes WD and WB are both in an alarm state, with node WD having one major alarm, and node WB having two critical alarms.

Link lines (118 and 120 for example) are displayed between each adjacent pair of node icons (74, 110, 122, etc.) representing the links between the associated nodes. Connecting the two node icons 122 and 124 representing nodes WD and WC is a link line 126. As discussed previously in the context of FIG. 2, this particular link connecting nodes WD and WC is a logical link which traverses nodes of a another technology layer. This fact is communicated by the presence of a layer icon 128 near the node icon representing the SONET layer "traversing node", or the last SONET layer node in the sequential order before the path traverses to nodes of the other technology layer. In this case, the SONET layer traversing node is node WD, and the layer icon 128 bisects the link line 126 immediately following the node icon 122 representing this node. To communicate the technology layer over whose nodes data traffic on the link between nodes WD and WC travels, a triangle symbol 130 is displayed within the layer icon 128, indicating the optical technology layer. The particular node layer represented by this layer icon 128 is also indicated by the "Optical" label appearing beside the layer icon 128.

To the left of this layer icon 128 appearing between the WD and WC node icons 122 and 124 is shown a selectable layer expander icon 132, which is a small triangle. That the triangle of this optical layer expander icon 132 points to the right indicates that selecting this icon will cause to be expanded a third line of nodes representing nodes of the optical layer (discussed further below with reference to FIG. 5).

The second line 108 of node icons is identified by a box 134, labeled at its top right corner by a layer icon 136 whose symbol within (a diamond) indicates that this node layer is a SONET layer. The second line 108 of node icons is also identified by a layer-identifier label 138.

In FIG. 4, the box 134 identifying the second line 108 of node icons is in dashed lines, whereas the box 92 identifying the first line 73 of node icons remains in solid lines, indicating that notwithstanding the expansion of the node icons representing the SONET layer, it is still the IP layer which is selected in the path explorer panel 70. As such, the topology panel 72 remains unchanged, still showing the IP layer.

Thus, the path explorer panel 70 shown in FIG. 4 informs the network administrator that the path being displayed consists of the nodes JE, WE, WD, WC, WB, WA and JD, in that order. The nodes JE and JD are IP nodes of an IP node layer. The nodes WE, WD, WC, WB and WA are SONET nodes of a SONET node layer. The link between the two nodes WD and WC is a logical link which travels over nodes of an optical node layer.

Figure 5:
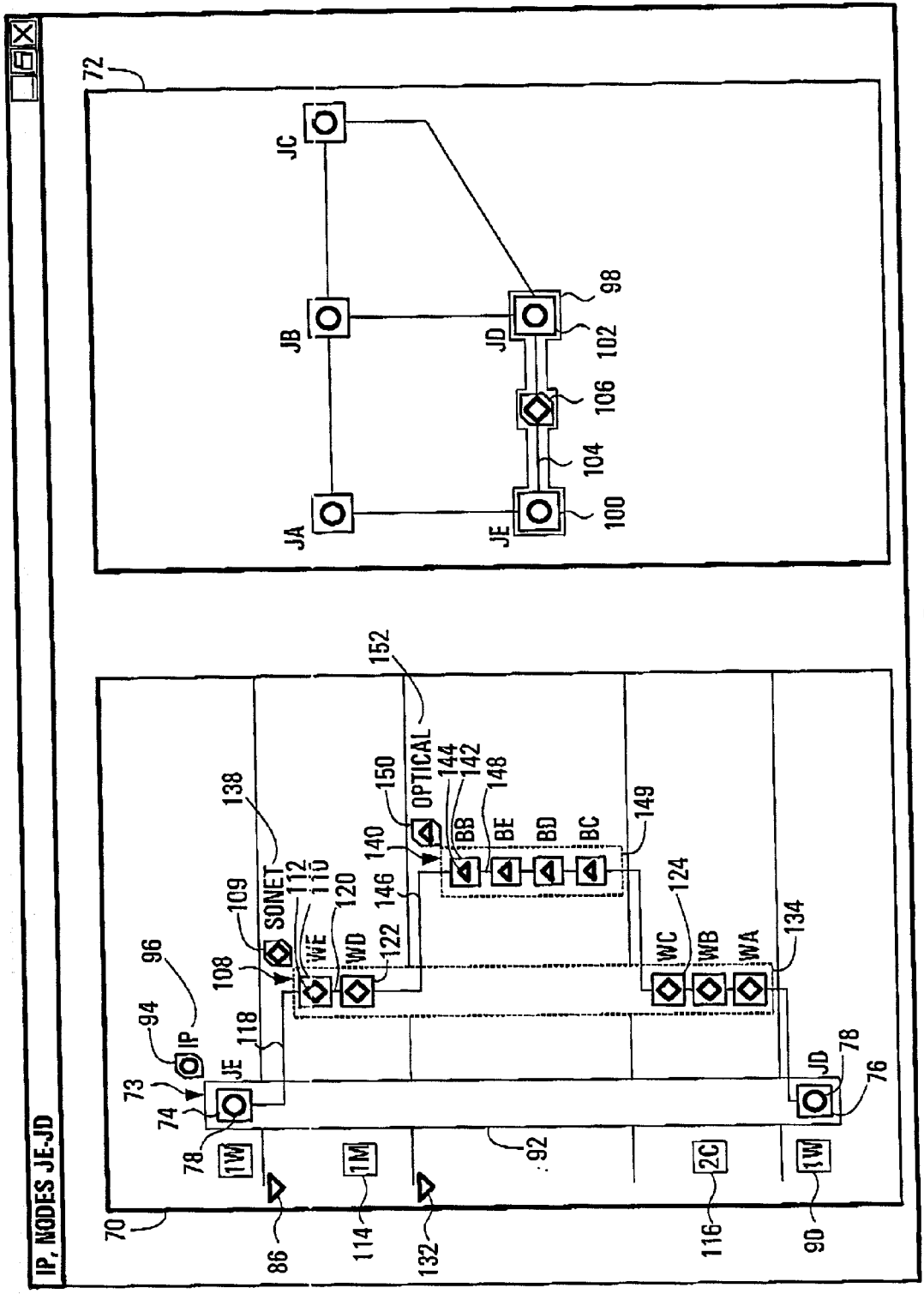
FIG. 5 is an illustration of the display of FIG. 4 wherein the network administrator has selected a third layer icon in the path explorer panel.

In FIG. 5, the network administrator has selected the layer expander icon 132 associated with the optical layer icon 128 between nodes WD and WC in the path explorer panel 70 in FIG. 4. As a result, a third line 140 of node icons representing nodes of the optical layer has been expanded in the path representation shown in the path explorer panel 70. As such, this layer expander icon 132 is now pointing down, indicating that the optical layer has been expanded.

In the illustrated example, the mechanism for this expansion is as follows. First, the number of path segments of which the path representation is comprised is increased by the number of optical node icons to be displayed. Second, both the SONET node icons representing nodes which follow the SONET traversing node WD, as well as the IP node icons representing nodes which follow the IP traversing node JE, are shifted down the path representation by this same number of path segments. Third, the third line 140 of node icons representing nodes of the optical layer is displayed in the vacated path segments of the path representation.

If the optical layer expander icon 132 is now selected again, the third line 140 of node icons would be collapsed returning the path explorer panel 70 to the state shown in FIG. 4. In particular, the third line 140 of node icons would be erased, the SONET node icons representing nodes which follow the SONET traversing node WD, as well as the IP node icons representing nodes which follow the IP traversing node JE would be shifted up the path representation by the number of optical node icons erased, and the number of path segments of which the path representation is comprised would be decreased by the same number.

The third line 140 of node icons is parallel to, and offset from the second line 108 of node icons to identify it as a separate line representing a different technology layer. Corresponding with the path illustrated in FIG. 2, the nodes of the optical layer through which the path of interest passes are nodes BB, BE, BD and BC. These nodes are represented once again by node icons (142 for example), this time with triangle symbols (144 for example) within, identifying the technology for these nodes as optical. In the case of the optical layer, there are no nodes which are part of the path of interest which are in an alarm state. As such, no alarm indicators appear to the left of the node icons (142 for example) of the third line 140.

Link lines (118, 120, 146 and 148 for example) are displayed between each adjacent pair of node icons (74, 110, 122, 142, etc.) representing the links between the represented nodes. In this case, none of these links are logical links. As such, none of the link lines are bisected by a layer icon.

The third line 140 of node icons is identified by a box 149, labeled at its top right corner by a layer icon 150 whose symbol within (a triangle) indicates that this node layer is the optical technology layer. The third line 140 of node icons is also identified by a layer-identifier label 152.

In FIG. 5, the box 149 identifying the third line 140 of node icons is in dashed lines, whereas the box 92 identifying the first line 73 of node icons remains in solid lines, indicating that notwithstanding the expansion of the node icons representing the optical layer, it is still the IP layer which is selected in the path explorer panel 70. As such, the topology panel 72 remains unchanged, still showing the IP layer.

Thus, the path explorer panel 70 shown in FIG. 5 informs the network administrator that the path being displayed consists of the nodes JE, WE, WD, BB, BE, BD, BC, WC, WB, WA and JD, in that order, and that this path traverses across three technology layers, an IP layer, a SONET layer and an optical layer.

Figure 6:
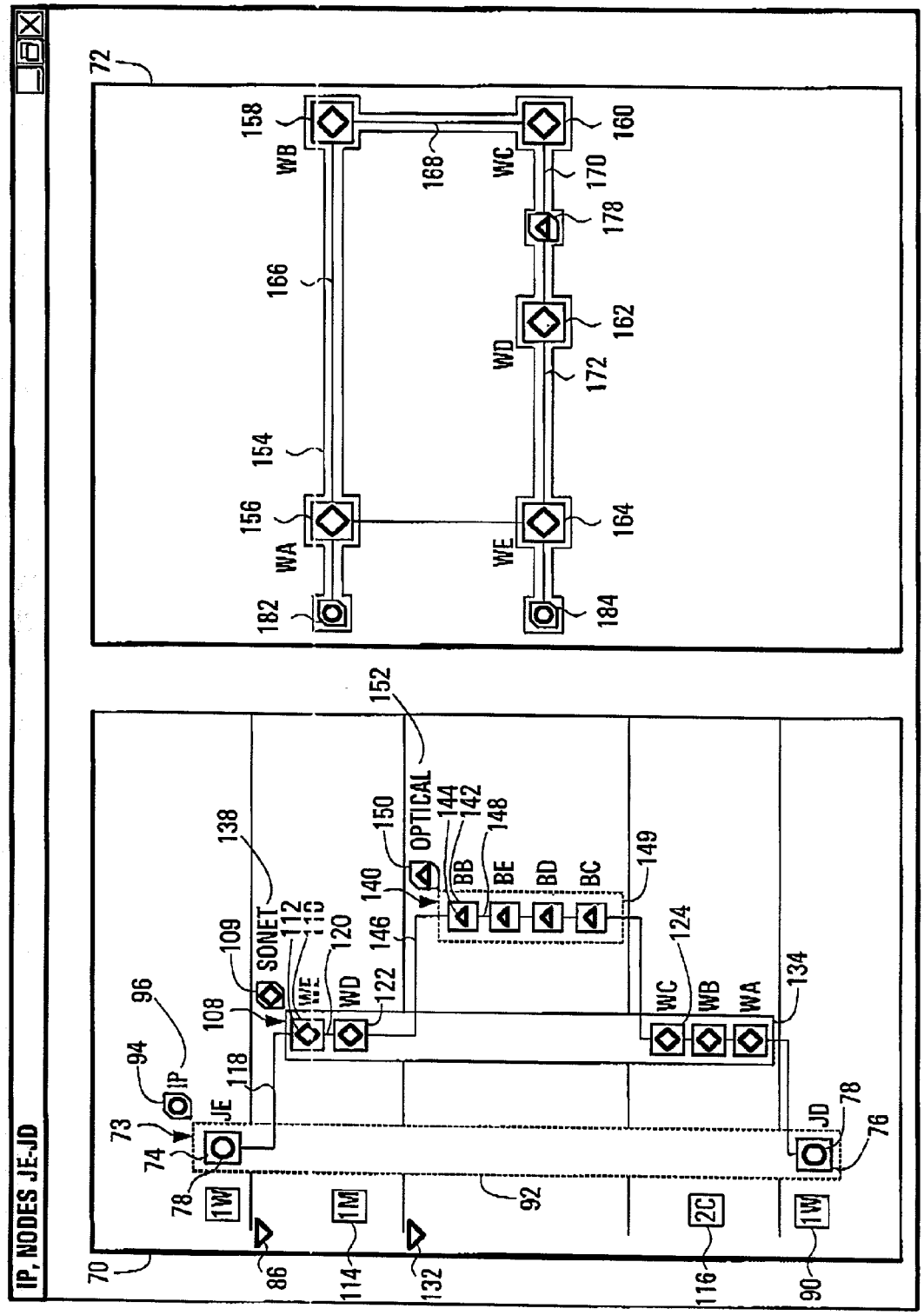
FIG. 6 is an illustration of the display of FIG. 5 wherein the network administrator has selected a second line of node icons in the path explorer panel.

In FIG. 6, the network administrator has selected the second line 108 of node icons in the path explorer panel 70. As such, the box 134 around the second line 108 of node icons is now in solid, while the box 92 around the first line 73 of node icons is now in dashed lines. Further, the topology panel 72 now displays a topology of the SONET layer.

The topology panel 72 in FIG. 6 is essentially identical to that appearing in the middle panel of the topology displayed in FIG. 2 and as such will not be described in detail here. Those node icons and link lines which are part of the path of interest are highlighted in the topology panel 72 by outlining 154. In this case, the network elements in the SONET layer which are part of the path of interest are the nodes WA, WB, WC, WD and WE represented by node icons 156, 158, 160, 162 and 164, and the links connecting adjacent nodes, represented by link lines 166, 168, 170 and 172. The presence of a layer icon 178 near the node icon 162 representing the SONET traversing node WD, in this case between the WC and WD rode icons 160 and 162 indicates that the link between these two nodes is a logical link which travels over the nodes of another node another technology layer. The symbol within this layer icon 178 (a triangle) indicates that this other technology layer is the optical technology layer.

To the left of the node icon 164 representing node WE, as well as the node icon 156 representing node WA are originating, and terminating IP layer icons 184 and 182 respectively. The Originating IP layer icon 184 appears near the SONET node icon 164 representing the first SONET layer node in the path, in this case node WE. The terminating IP layer icon 182 appears near the SONET node icon 156 representing the last SONET layer node in the path, in this case node WA. Each of the originating and terminating IP layer icons 184 and 182 respectively, have circle symbols therein, indicating that the path of interest arrives from nodes of the IP technology layer, and departs the SONET layer to nodes of the IP technology layer.

If the network administrator would like to know which node of the IP Technology layer each of the nodes WA and WE may be adjacent to, by passing a mouse pointer over either of the originating or terminating IP layer icons 184 and 182, the node icon in the path explorer panel 70 representing the adjacent node of the IP technology layer will be highlighted (not shown). In this case, if the mouse pointer is passed over the originating IP layer icon 184 near the WE node icon 164, the JE node icon 74 in the path explorer panel 70 will be highlighted. If the mouse pointer is passed over the terminating IP layer icon 182 near the WA node icon 156, the CD node icon 76 in the path explorer panel 70 will be highlighted.

Figure 7:
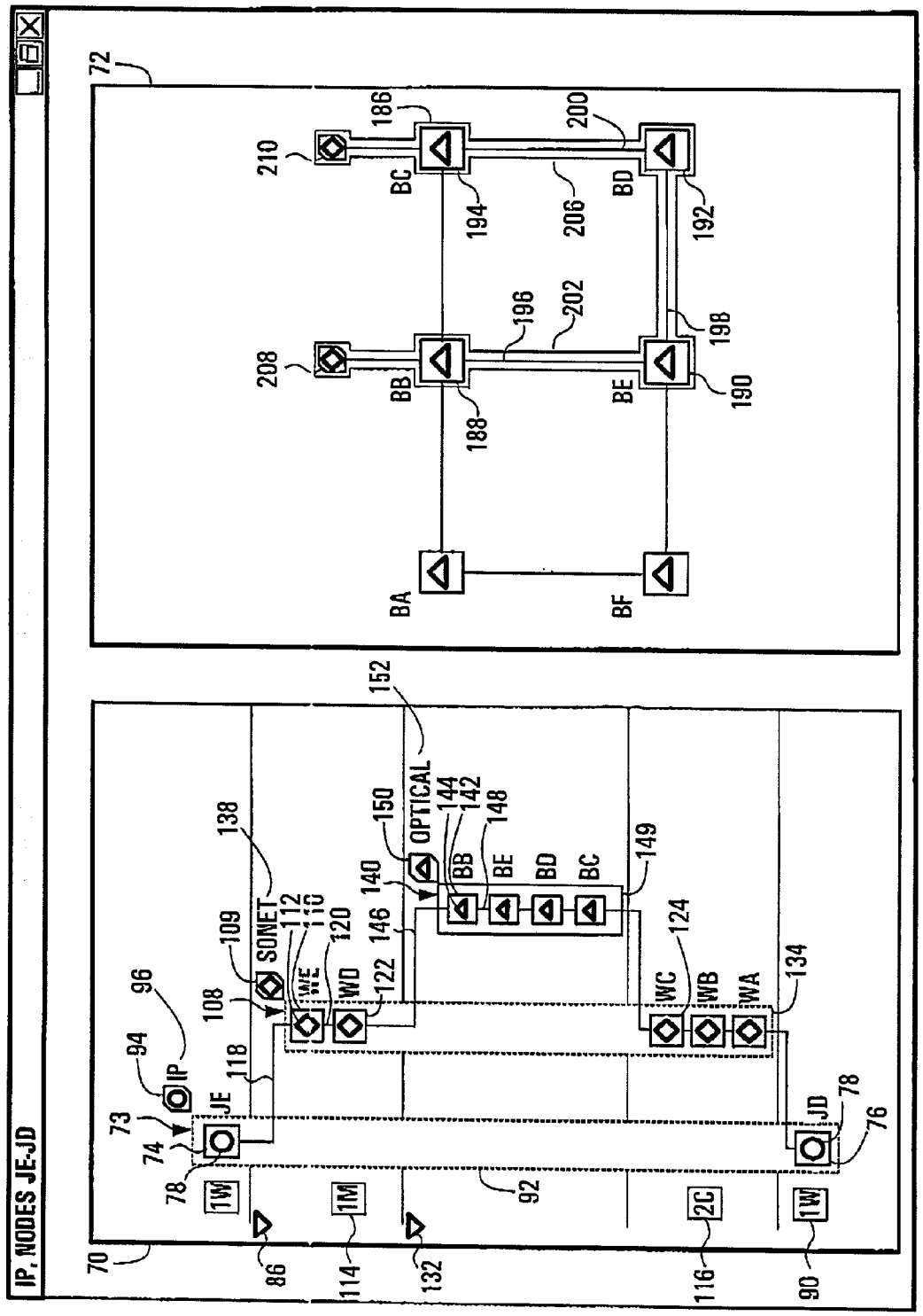
FIG. 7 is an illustration of the display of FIG. 6 wherein the network administrator has selected a third line of node icons in the path explorer panel.

In FIG. 7, the network administrator has selected the third line 140 of node icons in the path explorer panel 70. As such, the box 149 around the third line 140 of node icons is now in solid, while the box 134 around the second line 108 of node icons is now in dashed lines. Further, the topology panel 72 now displays a topology of the optical layer.

The topology panel 72 in FIG. 7 is essentially identical to that appearing in the bottom panel of the topology displayed in FIG. 2 and as such will not be described in detail here. Those node icons and link lines representing elements which are part of the path of interest are highlighted in the topology panel 72 by outlining 186. In this case, the network elements in the optical layer which are part of the path of interest are the nodes BB, BE, BD and BC represented by node icons 188, 190, 192 and 194, and the links connecting adjacent nodes, represented by link lines 196, 198 and 200.

Above the node icon 188 representing node BB, as well as the node icon 194 representing node BC are originating, and terminating SONET layer icons 208 and 210 respectively. The originating SONET layer icon 208 appears near the optical node icon 188 representing the first optical layer node in the path, in this case node BB. The terminating SONET layer icon 210 appears near the optical node icon 194 representing the last optical layer node in the path, in this case node BC. Each of the originating and terminating SONET layer icons 208 and 210 respectively, have diamond symbols therein, indicating that the path of interest arrives from nodes of the SONET technology layer, and departs the optical layer to nodes of the SONET technology layer.

If the network administrator would like to know which node of the SONET technology layer each of the nodes BB and BC may be adjacent to, by passing a mouse pointer over either of the originating or terminating SONET layer icons 208 and 210, the node icon in the path explorer panel 70 representing the adjacent node of the SONET technology layer will be highlighted (not shown). In this case, if the mouse pointer is passed over the originating SONET layer icon 208 near the BB node icon 188, the WD node icon 122 in the path explorer panel 70 will be highlighted. If the mouse pointer is passed over the terminating SONET layer icon 210 near the BC node icon 194, the WC node icon 124 in the path explorer panel 70 will be highlighted.

The information appearing in both the path explorer panel 70 and the topology panel 72 may also be manipulated by clicking on designated icons in the topology panel 72. For example, if while the topology panel 72 is displaying the topology of the IP layer, as shown in FIG. 3, the network administrator were to click on the layer icon 109 representing the logical link between nodes JE and JD, then the network administrator would be selecting the node layer represented by that layer icon 109, in this case the SONET layer. As a result, if it is not displayed already, the path representation displayed in the path explorer panel 70 would display the second line 108 of node icons representing nodes of the SONET layer, and this second line 108 of node icons would be highlighted. Furthermore, in the topology panel 72 would be displayed the topology of this SONET layer.

Similarly, if while the topology panel 72 is displaying the topology of the SONET layer, as shown in FIG. 6, the network administrator were to click on the layer icon 178 representing the logical link between nodes WD and WC, then the network administrator would be selecting the node layer represented by that layer icon 178, in this case the optical layer. As a result, if it is not displayed already, the path representation displayed in the path explorer panel 70 would display the third line 140 of node icons representing nodes of the optical layer, and this third line 140 of node icons would be highlighted. Furthermore, in the topology panel 72 would be displayed the topology of this optical layer.

Alternatively, if while the topology panel 72 is displaying the topology of the SONET layer, as shown in FIG. 6, the network administrator were to click on one of the originating or terminating IP layer icons 184, 182 adjacent to either of nodes WE or WA, then the network administrator would be selecting the node layer represented by those layer icons, in this case the IP layer. As a result, the first line 73 of node icons in the path explorer panel 70 would be highlighted, and the topology panel 72 would display the topology of the IP layer.

Similarly, if while the topology panel 72 is displaying the topology of the optical layer, as shown in FIG. 7, the network administrator were to click on one of the originating or terminating SONET layer icons 208, 210 adjacent to either of nodes BB or BC, then the network administrator would be selecting the node layer represented by that layer icon, in this case the SONET layer. As a result, the second line 108 of node icons in the path explorer panel 70 would be highlighted, and the topology panel 72 would display the topology of the SONET layer.

Having described the appearance and panel interaction of a preferred embodiment method of the present invention, a particular example of functionality behind the operation of this preferred embodiment method will now be described with reference to the flowchart shown in FIG. 8. More generally, any functionality which is capable of transforming a database of network connectivity, element characteristics and performance information into displays such as exemplified herein may be employed.

Figure 8:
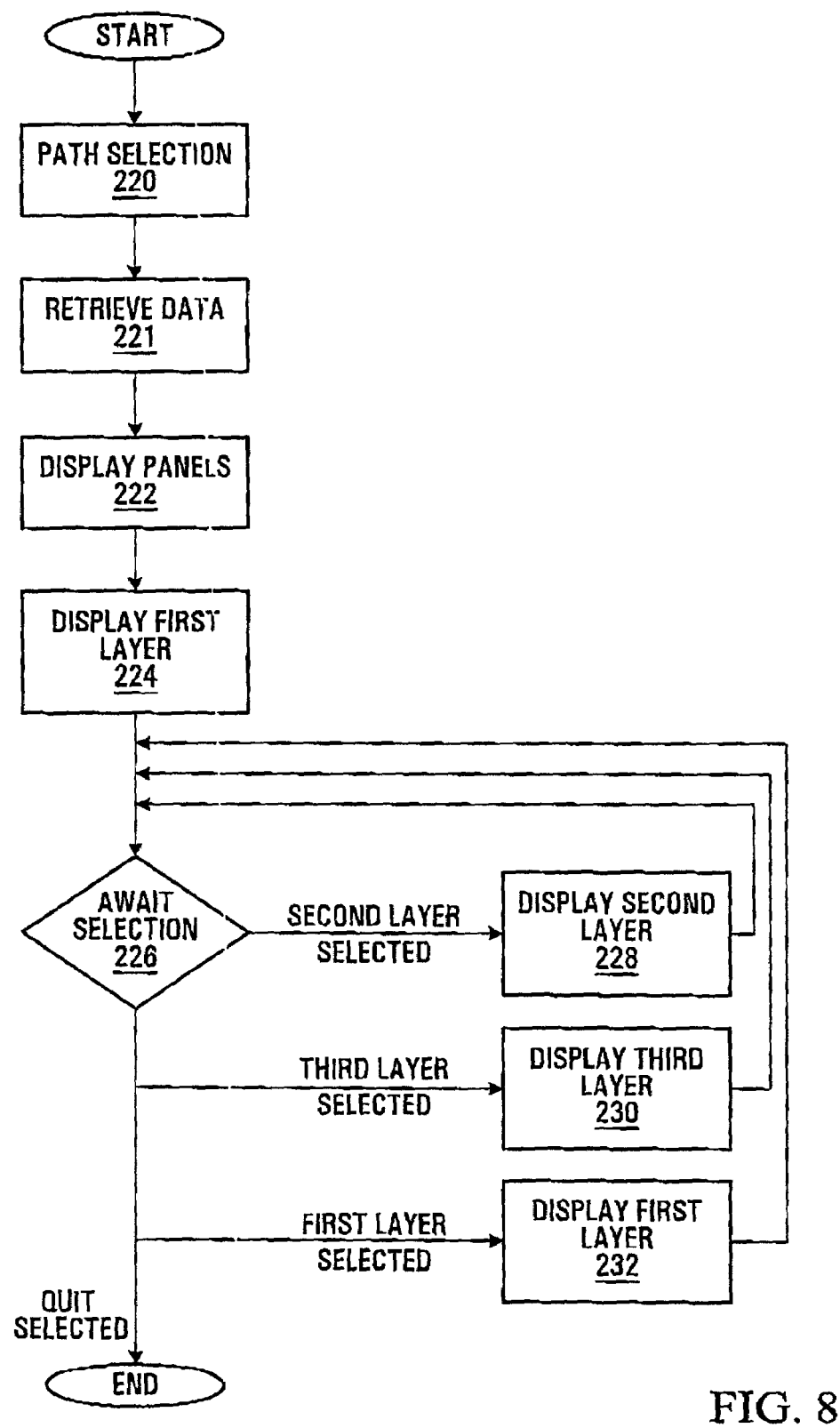
FIG. 8 is a flow chart illustrating the functionality behind the preferred embodiment method of the present invention.

FIG. 8 shows a flow chart for the basic functionality of the preferred embodiment method of the present invention. Not all features described above are illustrated in FIG. 8, or described below.

First, the network administrator using the method selects 220 a path of data travel across the network 20. The processor 28 of the NMD 26 retrieves 221 from the local database 36 and the network database 24, static and dynamic data relevant to then path, as necessary. Such data may include identification, architectural, technology layer and/or status information on the nodes and links of which the selected path is comprised. Next, the outlines of the path explorer panel 70 and the topology panel 72 are displayed 222 on the display 30.

The processor 28 then processes the data retrieved for the selected path, defines the nodes into technology layers, and displays 224 in the path explorer panel 70 the first line 73 of node icons and link lines representing the nodes and links of the IP layer for the selected path, and in the topology panel 72, node icons and link lines also representing the nodes and links of the IP layer for the selected path. Such a display is exemplified in FIG. 3.

Next, the processor 28 awaits 226 further input from the user.

If the second, or SONET layer is selected, the second line 108 of node icons is displayed 228 in the path explorer panel 70 if it is not already displayed, and this second line 108 of node icons is highlighted. Further, depending on how the SONET layer was selected (as discussed in further detail above), the topology of the SONET layer may also be displayed 228 in the topology panel 72. The SONET layer may be selected in any one of four ways. First, the layer expander icon 86 associated with the SONET layer icon 82 in the first line 73 of node icons in the path explorer panel 70, as shown in FIG. 3, may be selected. Second, once displayed, the second line 108 of node icons in the path explorer panel 70, may be selected. Third, while the topology panel 72 is displaying the topology of the IP layer, the layer icon 106 representing the SONET layer may be selected. Finally, while the topology panel 72 is displaying the topology of the optical layer, either of the originating or terminating SONET layer icons 208, 210 representing the SONET layer may be selected.

If the optical layer is selected, the third line 140 of node icons is displayed 230 in the path explorer panel 70 if it is not already displayed, and this third line 140 of node icons is highlighted. Further, depending on how the optical layer was selected (as discussed in further detail above), the topology of the optical layer may also be displayed in the topology panel 72. The optical layer may be selected in any one of three ways. First, the layer expander icon 130 associated with the optical layer icon in the second line 108 of node icons in the path explorer panel 70, as shown in FIG. 4, may be selected. Second, once displayed, the third line 140 of node icons in the path explorer panel 70, may be selected. Third, while the topology panel 72 is displaying the topology of the SONET layer, the layer icon 178 representing the optical layer may be selected.

If the IP layer is selected, the first line 73 of node icons is highlighted 232 in the path explorer panel 70. Further, depending on how the IP layer is selected (as discussed in further detail above), the topology of the IP layer may also be displayed 232 in the topology panel 72. The IP layer may be selected in either of two ways. First, the first line 73 of node icons in the path explorer panel 70, may be selected.

Second, while the topology panel 72 is displaying the topology of the SONET layer, either of the originating or terminating IP layer icons 182, 184 representing the IP layer may be selected.

Although in the foregoing description of a preferred embodiment method of the present invention, the functionality of, and information communicated by the displays of the method have been described in detail, it is to be understood that the particular functionality of the panels, the particular information displayed in each panel, and the manner in which the information is displayed may be altered without necessarily departing from the scope of the present invention which is defined in the claims which follow. Simply by way of example, although the node icons and layer icons have been shown having a particular appearance and shape, other appearances and shapes are of course possible. Further, different symbols other than those displayed in the illustrated examples may be used to indicate the relevant technology layers. Also, although visual distinguishing or highlighting of particular elements of the displays of the preferred embodiment method have been shown using outlining, other forms of visual distinguishing or highlighting may be used, shadowing, shading, or through use of different colours, for example. Additionally, although the path explorer and topology panels have been illustrated as being panels within a window, the relevant information may alternatively be displayed in any type of view, separate windows, or in a single panel for example.

It is further to be understood that the data displayed in the figures are of course for illustrative purposes only, and that other data may be displayed using the method of the present invention. For example, the selected path may contain nodes of more or less than three technology layers. Further, the selected path may contain nodes of more than one node group of a given technology layer, which separate groups may be identified in the panels.

As discussed above, although the preferred embodiment method of the present invention has been discussed in the context of a particular type of telecommunication application, it is to be understood that the present invention could also be used in other types of telecommunication applications, for example where telecommunication nodes are organized into layers using criteria other than technology, as well as in business plan applications, distribution applications, transportation applications, and any other application wherein it is desirable to view a path consisting of a number of nodes in multiple node layers. By way of example, the present invention could be used to view a path a shipment may take through a distribution network, wherein the nodes layers include a pick-up/delivery layer, a storage layer, a trucking layer, and an air transportation layer. Similarly, the present invention could be used to view the path a business proposal may take through a business plan network consisting of a planning committee layer, a finance layer, an engineering layer, and a marketing layer. In a transportation application, the present invention may be used to explore a path taken by an individual through a road transport layer, a rail transport layer, a water transport layer, and an air transport layer.

Additionally, it is to be noted that the present invention also contemplates a GUI (graphical user interface) embodying the method of the present invention, a computer-readable medium having stored thereon instructions for directing a host computer to implement the method of the present invention (in the exemplary computer system illustrated in FIG. 1, the instructions stored on the computer readable medium may be stored on the local database 36, and executed by the processor 28 of the NMD 26), as well as a computer system adapted to executed a path explorer application directing a computer to implement the method of the present invention.

Finally, it is to be understood that the method of the present invention may be implemented for execution on a computer system using any suitable computer language, object-oriented computer language such as Java, for example.

Numerous modifications and variations of the present invention are possible in light of the above teachings. It is therefore to be understood that within the scope of the appended claims, the invention may be practiced otherwise than as specifically described herein.

The invention claimed is:

1. A method in a computer system for displaying a representation of a path between two nodes of a multi-layer network, said path comprising a plurality of nodes interconnected by links in a sequential order, said method comprising:
displaying in a path explorer view, a path representation comprising a first line of node icons, each of said first line node icons representing a respective node of a first node layer of the network;
displaying any logical link between two nodes in the path that traverses nodes of a second node layer, the logical link being indicated by a layer icon that bisects a link line that represents the logical link;
displaying a selectable layer expander icon; and
upon a first selection of the layer expander icon, displaying in the path representation, a second line of node icons each representing a respective node of the second node layer of the network, said second line being parallel to, and offset from the first line;
wherein the node icons are positioned in sequential order along the path representation.

2. The method of claim 1 further comprising:
upon a second selection of the layer expander icon, erasing from the path representation, the second line of node icons.

3. The method of claim 1 wherein the path representation is divided into a plurality of path segments along its length, each of which path segments contains one node icon, and wherein the nodes of the second node layer immediately follow a traversing node of the first node layer in the sequential order, said method further comprising:
prior to the first selection of the layer expander icon, the first line node icons are displayed in adjacent path segments; and
upon the first selection of the layer expander icon, increasing the number of path segments by the number of second line node icons to be displayed, shifting the first line node icons representing nodes which follow the traversing node down the path representation by the same number of path segments, and displaying the second line node icons in the vacated path segments.

4. The method of claim 3 further comprising:
upon a second selection of the layer expander icon, erasing the second line node icons, shifting the first line node icons representing nodes which follow the traversing node up the path representation by the number of second line node icons erased, and decreasing the number of path segments by the same number.

5. The method of claim 1 wherein the nodes of the second node layer immediately follow a traversing node of the first node layer, said method further comprising:

displaying the layer expander icon near the first line node icon representing the traversing node of the first node layer.

6. The method of claim 1 further comprising:
displaying between each pair of adjacent node icons along the path representation, a link line.

7. The method of claim 1, wherein the first node layer further comprises links connecting the nodes of the first node layer, and said path further comprises links connecting adjacent nodes of the path, said method further comprising:
displaying in a topology view, a graphical representation of a structure of the first node layer, said graphical representation of the structure of the first node layer comprising node icons representing nodes of the first node layer, and link lines representing links connecting nodes of the first node layer;
visually distinguishing in the topology view, the node icons representing the first layer nodes of which the path is comprised, and the link lines representing the links connecting the first layer nodes of the path; and
visually distinguishing in the path explorer view, the first line of node icons.

8. The method of claim 7, wherein the second node layer further comprises links connecting the nodes of the second node layer, and the second line of node icons in the path explorer view is selectable, said method further comprising:
upon selection of the second line of node icons in the path explorer view:
visually distinguishing in the path explorer view, the second line of node icons;
erasing in the topology view, the graphical representation of the structure of the first node layer;
displaying in the topology view, a graphical representation of a structure of the second node layer, said graphical representation of the structure of the second node layer comprising node icons representing nodes of the second node layer, and link lines representing the links connecting the nodes of the second node layer; and
visually distinguishing in the topology view, the node icons representing the second layer nodes of which the path is comprised, and the link lines representing the links connecting the second layer nodes of the path.

9. The method of claim 8 further comprising:
displaying in the graphical representation of the structure of the second node layer in the topology view, an originating first layer icon near the node icon representing the first second layer node in the path, and a terminating first layer icon near the node icon representing the last second layer node in the path; and
upon selection of either one of the originating and the terminating first layer icons in the topology view:
visually distinguishing in the path explorer view, the first line of node icons;
erasing in the topology view, the graphical representation of the structure of the second node layer;
displaying in the topology view, the graphical representation of the structure of the first node layer; and
visually distinguishing in the topology view, the node icons representing the first layer nodes of which the path is comprised, and the link lines representing the links connecting the first layer nodes of the path.

10. The method of claim 8 further comprising:
displaying in the graphical representation of the structure of the second node layer in the topology view, an originating first layer icon near the node icon representing the first second layer node in the path, and a terminating first layer icon near the node icon representing the last second layer node in the path;
upon selection of the originating first layer icon in the topology view, visually distinguishing in the graphical representation of the structure of the first node layer in the path explorer view, the node icon representing the first layer node adjacent to the first second layer node in the path; and
upon selection of the terminating first layer icon in the topology view, visually distinguishing in the graphical representation of the structure of the first node layer in the path explorer view, to node icon representing the first layer node adjacent to the last second layer node into path.

11. The method of claim 7, wherein the nodes of the second node layer immediately follow a traversing node of the first node layer, and the second node layer further comprises links connecting the nodes of the second node layer, said method further comprising:
displaying in the graphical representation of the structure of the first node layer in the topology view, a layer icon near the node icon representing the traversing node; and
upon selection of the said layer icon in the topology view:
displaying in the path explorer view, the second line of node icons;
visually distinguishing in the path explorer view, the second line of node icons;
erasing in the topology view, the graphical representation of the structure of the first node layer;
displaying in the topology view, a graphical representation of a structure of the second node layer, said graphical representation of the structure of the second node layer comprising node icons representing nodes of the second node layer, and link lines representing the links connecting the nodes of the second node layer; and
visually distinguishing in the topology view, th& node icons representing the second layer nodes of which the path is comprised, and the link lines representing the links connecting the second layer nodes of the path.

12. The method of claim 1 wherein the path is a path of data traffic through a telecommunication network, and the first node layer comprises nodes of a different technology from the nodes of which the second node layer is comprised.

13. A computer-readable medium having stored thereon, instructions for a computer system to display a representation of a path between two nodes of a multi-layer network, said path comprising a plurality of nodes interconnected by links in a sequential order, said instructions causing said computer system to:
display in a path explorer view, a path representation comprising a first line of node icons, each of said first line node icons representing a respective node of a first node layer of the network;
display any logical link between two nodes in the path that traverses nodes of a second node layer, the logical link being indicated by a layer icon that bisects a link line that represents the logical link;
display a selectable layer expander icon; and
upon a first selection of the layer expander icon, display in the path representation, a second line of node icons each representing a respective node of the second node layer of the network, said second line being parallel to, and offset from the first line;
wherein the node icons are positioned in sequential order along the path representation.

14. The computer-readable medium of claim 13, said instructions further causing said computer system to:
   upon a second selection of the layer expander icon, erase from the path representation, the second line of node icons.

15. The computer-readable medium of claim 13 wherein the path representation is divided into a plurality of path segments along its length, each of which path segments contains one node icon, and wherein the nodes of the second node layer immediately follow a traversing node of the first node layer in the sequential order, said instructions further causing said computer system to:
   prior to the first selection of the layer expander icon, display the first line node icons in adjacent path segments; and
   upon the first selection of the layer expander icon, increase the number of path segments by the number of second line node icons to be displayed, shift the first line node icons representing nodes which follow the traversing node down the path representation by the same number of path segments, and display the second line node icons in the vacated path segments.

16. The computer-readable medium of claim 15, said instructions further causing said computer system to:
   upon a second selection of the layer expander icon, erase the second line node icons, shift the first line node icons representing nodes which follow the traversing node up the path representation by the number of second line node icons erased, and decrease the number of path segments by the same number.

17. The computer-readable medium of claim 13 wherein the nodes of the second node layer immediately follow a traversing node of the first node layer, said instructions further causing said computer system to:
   display the layer expander icon near the first line node icon representing the traversing node of the first node layer.

18. The computer-readable medium of claim 13, said instructions further causing said computer system to:
   display between each pair of adjacent node icons along the path representation, a link line.

19. The computer-readable medium of claim 13, wherein the first node layer further comprises links connecting the nodes of the first node layer, and said path further comprises links connecting adjacent nodes of the path, said instructions further causing said computer system to:
   display in a topology view, a graphical representation of a structure of the first node layer, said graphical representation of the structure of the first node layer comprising node icons representing nodes of the first node layer, and link lines representing links connecting nodes of the first node layer;
   visually distinguish in the topology view, the node icons representing the first layer nodes of which the path is comprised, and the link lines representing the links connecting the first layer nodes of the path; and
   visually distinguish in the path explorer view, the first line of node icons.

20. The computer-readable medium of claim 19, wherein the second node layer further comprises links connecting the nodes of the second node layer, and the second line of node icons in the path explorer view is selectable, said instructions further causing said computer system to:
   upon selection of the second line of node icons in the path explorer view:
      visually distinguish in the path explorer view, the second line of node icons;
      erase in the topology view, the graphical representation of the structure of the first node layer;
      display in the topology view, a graphical representation of a structure of the second node layer, said graphical representation of the structure of the second node layer comprising node icons representing nodes of the second node layer, and link lines representing the links connecting the nodes of the second node layer; and
      visually distinguish in the topology view, the node icons representing the second layer nodes of which the path is comprised, and the link lines representing the links connecting the second layer nodes of the path.

21. The computer-readable medium of claim 20, said instructions further causing said computer system to:
   display in the graphical representation of the structure of the second node layer in the topology view, an originating first layer icon near the node icon representing the first second layer node in the path, and a terminating first layer icon near the node icon representing the last second layer node in the path; and
   upon selection of either one of the originating and the terminating first layer icons in the topology view:
      visually distinguish in the path explorer view, the first line of node icons;
      erase in the topology view, the graphical representation of the structure of the second node layer;
      display in the topology view, the graphical representation of the structure of the first node layer; and
      visually distinguish in the topology view, the node icons representing the first layer nodes of which the path is comprised, and the link lines representing the links connecting the first layer nodes of the path.

22. The computer-readable medium of claim 20, said instructions further causing said computer system to:
   display in the graphical representation of the structure of the second node layer in the topology view, an originating first layer icon near the node icon representing the first second layer node in the path, and a terminating first layer icon near the node icon representing the last second layer node in the path;
   upon selection of the originating first layer icon in the topology view, visually distinguish in the graphical representation of the structure of the first node layer in the path explorer view, the node icon representing the first layer node adjacent to the first second layer node in the path; and
   upon selection of the terminating first layer icon in the topology view, visually distinguish in the graphical representation of the structure of the first node layer in the path explorer view, the node icon representing the first layer node adjacent to the last second layer node in the path.

23. The computer-readable medium of claim 19, wherein the nodes of the second node layer immediately follow a traversing node of the first node layer, and the second node layer further comprises links connecting the nodes of the second node layer, said instructions further causing said computer system to:
   display in the graphical representation of the structure of the first node layer in the topology view, a layer icon near the node icon representing the traversing node; and
   upon selection of the said layer icon in the topology view:
      display in the path explorer view, the second line of node icons;

visually distinguish in to path explorer view, the second line of node icons;

erase in the topology view, the graphical representation of the structure of the first node layer;

display in the topology view, a graphical representation of a structure of the second node layer, said graphical representation of the structure of the second node layer comprising node icons representing nodes of the second node layer, and link lines representing the links connecting the nodes of the second node layer; and visually distinguish in the topology view, the node icons representing the second layer nodes of which the path is comprised, and the link lines representing the links connecting the second layer nodes of the path.

24. The computer-readable medium of claim 13 wherein the path is a path of data traffic through a telecommunication network, and the first node layer comprises nodes of a different technology from the nodes of which the second node layer is comprised.

25. A path explorer computer system for exploring a path between two nodes of a multi-layer network, said path comprising a plurality of nodes connected by links in a sequential order, said computer system comprising:

a database containing information for the path;

a processor connected to said database operable to retrieve path information from the database;

a display connected to said processor for displaying path information; and path information display means associated with said processor operable to cause said processor to:

display in a path explorer view, a path representation comprising a first line of node icons, each of said first line node icons representing a respective node of a first node layer of the network;

displaying any logical link between two nodes in the path that traverses nodes of a second node layer, the logical link being indicated by a layer icon that bisects a link line that represents the logical link;

display a selectable layer expander icon; and upon a first selection of the layer expander icon, display in the path representation, a second line of node icons each representing a respective node of the second node layer of the network, said second line being parallel to, and offset from the first line;

wherein the node icons are positioned in sequential order along the path representation.

26. The computer system of claim 25, wherein said path information display means is further operable to cause said processor to:

upon a second selection of the layer expander icon, erase from the path representation, the second line of node icons.

27. The computer system of claim 25 wherein the path representation is divided into a plurality of path segments along its length, each of which path segments contains one node icon, and wherein the nodes of the second node layer immediately follow a traversing node of the first node layer in the sequential order, wherein said path information display means is further operable to cause said processor to:

prior to the first selection of the layer expander icon, display the first line node icons in adjacent path segments; and upon the first selection of the layer expander icon, increase the number of path segments by the number of second line node icons to be displayed, shift the first line node icons representing nodes which follow the traversing node down the path representation by the same number of path segments, and display the second line node icons in the vacated path segments.

28. The computer system of claim 27, wherein said path information display means is further operable to cause said processor to:

upon a second selection of the layer expander icon, erase the second line node icons, shift the first line node icons representing nodes which follow the traversing node up the path representation by the number of second line node icons erased, and decrease the number of path segments by the same number.

29. The computer system of claim 25 wherein the nodes of the second node layer immediately follow a traversing node of the first node layer, wherein said path information display means is further operable to cause said processor to:

display the layer expander icon near the first line node icon representing the traversing node of the first node layer.

30. The computer system of claim 25, wherein said path information display means is further operable to cause said processor to:

display between each pair of adjacent node icons along the path representation, a link line.

31. The computer system of claim 25, wherein the first node layer further comprises links connecting the nodes of the first node layer, and said path further comprises links connecting adjacent nodes of the path, wherein said path information display means is further operable to cause said processor to:

display in a topology view, a graphical representation of a structure of the first node layer, said graphical representation of the structure of the first node layer comprising node icons representing nodes of the first nodes layer, and link lines representing links connecting nodes of the first node layer;

visually distinguish in the topology view, the node icons representing the first layer nodes of which the path is comprised, and the link lines representing the links connecting the first layer nodes of the path; and visually distinguish in the path explorer view, the first line of node icons.

32. The computer system of claim 31, wherein the second node layer further comprises links connecting the nodes of the second node layer, and the second line of node icons in the path explorer view is selectable, wherein said path information display means is further operable to cause said processor to:

upon selection of the second line of node icons in the path explorer view:

visually distinguish in the path explorer view, the second line of node icons;

erase in the topology view, the graphical representation of the structure of the first node layer;

display in the topology view, a graphical representation of a structure of the second node layer, said graphical representation of the structure of the second node layer comprising node icons representing nodes of the second node layer, and link lines representing the links connecting the nodes of the second node layer; and visually distinguish in the topology view, the node icons representing the second layer nodes of which the path is comprised, and the link lines representing the links connecting the second layer nodes of the path.

33. The computer system of claim 32, wherein said path information display means is further operable to cause said processor to:
 display in the graphical representation of the structure of the second node layer in the topology view, an originating first layer icon near the node icon representing the first second layer node in the path, and a terminating first layer icon near the node icon representing the last second layer node in the path; and
 upon selection of either one of the originating and the terminating first layer icons in the topology view:
  visually distinguish in the path explorer view, the first line of node icons;
  erase in the topology view, the graphical representation of the structure of the second node layer;
  display in the topology view, the graphical representation of the structure of the first node layer; and
  visually distinguish in the topology view, the node icons representing the first layer nodes of which the path is comprised, and the link lines representing the links connecting the first layer nodes of the path.

34. The computer system of claim 32, wherein said path information display means is further operable to cause said processor to:
 display in the graphical representation of the structure of the second node layer in the topology view, an originating first layer icon near the node icon representing the first second layer node in the path, and a terminating first layer icon near the node icon representing the last second layer node in the path;
 upon selection of the originating first layer icon in the topology view, visually distinguish in the graphical representation of the structure of the first node layer in the path explorer view, the node icon representing the first layer node adjacent to the first second layer node in the path; and
 upon selection of the terminating first layer icon in the topology view, visually distinguish in the graphical representation of the structure of the first node layer in the path explorer view, the node icon representing the first layer node adjacent to the last second layer node in the path.

35. The computer system of claim 31, wherein the nodes of the second node layer immediately follow a traversing node of the first node layer, and the second node layer further comprises links connecting the nodes of the second node layer, wherein said path information display means is further operable to cause said processor to:
 display in the graphical representation of the structure of the first node layer in the topology view, a layer icon near the node icon representing the traversing node; and
 upon selection of the said layer icon in the topology view:
  display in the path explorer view, the second line of node icons;
  visually distinguish in the path explorer view, the second line of node icons;
  erase in the topology view, the graphical representation of the structure of the first node layer;
  display in the topology view, a graphical representation of a structure of the second node layer, said graphical representation of the structure of the second node layer comprising node icons representing nodes of the second node layer, and link lines representing the links connecting the nodes of the second node layer; and
  visually distinguish in the topology view, the node icons representing the second layer nodes of which the path is comprised, and the link lines representing the links connecting the second layer nodes of the path.

36. The computer system of claim 25 wherein the path is a path of data traffic through a telecommunication network, and the first node layer comprises nodes of a different technology from the nodes of which the second node layer is comprised.

* * * * *